United States Patent
Yonemitsu (10) Patent No.: US 8,248,520 B2
(45) Date of Patent: Aug. 21, 2012

(54) IMAGING APPARATUS AND IMAGING METHOD

(75) Inventor: Tetsumasa Yonemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 12/574,754

(22) Filed: Oct. 7, 2009

(65) Prior Publication Data

US 2010/0091177 A1    Apr. 15, 2010

(30) Foreign Application Priority Data

Oct. 10, 2008    (JP) ............................... P2008-264332

(51) Int. Cl.
*H04N 5/222*    (2006.01)

(52) U.S. Cl. ....................................................... 348/371

(58) Field of Classification Search .................. 348/203, 348/207.1, 246, 362, 370, 371, 373; 396/166, 396/173

See application file for complete search history.

(56) References Cited

U.S. PATENT DOCUMENTS

| | | | |
|---|---|---|---|
| 7,365,780 B1 * | 4/2008 | Miyazaki | 348/231.6 |
| 7,414,666 B2 * | 8/2008 | Yamaguchi | 348/371 |
| 7,440,023 B2 * | 10/2008 | Ueyama | 348/371 |
| 7,630,015 B2 * | 12/2009 | Okamura | 348/371 |
| 2003/0107669 A1 * | 6/2003 | Ito et al. | 348/370 |
| 2003/0122946 A1 | 7/2003 | Nishino et al. | |
| 2006/0284996 A1 * | 12/2006 | Kanai et al. | 348/294 |

FOREIGN PATENT DOCUMENTS

| | | |
|---|---|---|
| JP | 2000 341580 | 12/2000 |
| JP | 2001-249396 | 9/2001 |
| JP | 2002 359744 | 12/2002 |
| JP | 2004-147278 | 5/2004 |
| JP | 2008 79136 | 4/2008 |
| JP | 2009 124260 | 6/2009 |

* cited by examiner

*Primary Examiner* — Trung Diep
(74) *Attorney, Agent, or Firm* — Frommer Lawrence & Haug LLP; William S. Frommer; Thomas F. Presson (57) ABSTRACT

An imaging apparatus includes: an imaging device; an imaging device control portion supplying the imaging device with a read command signal; an operation input portion accepting an input of a flash light emission command; a control portion setting a predetermined interval as an output interval of the read command signal and setting output timing of a flash control signal to make the flash to emit light so that a period since a start till an end of light emission is included within a period since completion of reading of the signal charges till an input of a following second read command signal; and a timing control portion supplying the flash control signal to the flash and supplies a read control signal to make the read command signal be outputted at the predetermined interval according to an input of the flash light emission command and the output timing.

6 Claims, 7 Drawing Sheets

IMAGING APPARATUS AND IMAGING METHOD

BACKGROUND OF THE INVENTION

1. Field of the Invention

The present invention relates to an imaging apparatus and an imaging method, and more particularly, to a technique of controlling the light emission timing of a flash in an imaging apparatus performing line exposure.

2. Description of Related Art

Recently, a CMOS (Complementary Metal Oxide Semiconductor) sensor is used often as an imaging device in a digital camera and a video camera owing to the advantages resulting from its configuration of having an amplifier in each unit pixel, such as suppression of the occurrence of electrical noises when reading out photoelectrically converted signal charges and less power consumption.

Figure 8:
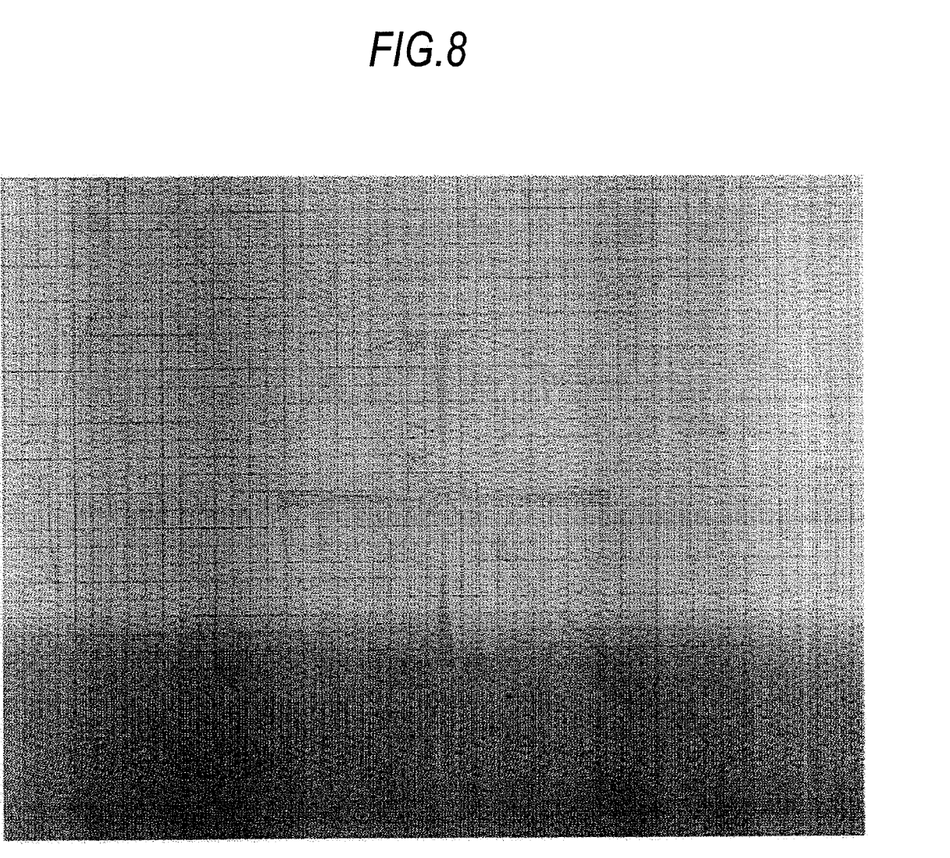
FIG. 8 is a view used to describe an example of a case where the luminance varies between the top and the bottom of the screen according to an imaging method in the related art.

In an imaging device of the CMOS, however, a pixel having outputted signal charges starts to accumulate a photoelectrically converted signal again at the time point of output. Accordingly, the accumulation period shifts according to the scan timing on the imaging plane. The reading method as above is generally referred to as line exposure or as rolling shutter. In a case where signal charges are read out by this method, when the flash is used while an image is being taken, there may occur a phenomenon in which the luminance varies between the top and the bottom of the screen as is shown in FIG. 8. Such a phenomenon occurs in a case where signal charges are read out since the start till the end of light emission of the flash, that is, while the flash is flashing.

Because an image in a ⅔ region on the upper side of FIG. 8 is made up of signal charges accumulated while the flash is emitting light, the luminance is high. By contrast, because an image in a ⅓ region on the lower side of FIG. 8 is made up of signal charges accumulated after the flash emitted light, the luminance is low.

As a technique of solving such a problem, JP-A-2001-249396 discloses a technique of controlling light emission timing of the flash according to an open and close state of a focal plane shutter and an accumulation state of signal charges for a camera used for both silver salt filming and electronic filming.

SUMMARY OF THE INVENTION

A similar problem occurs with an imaging apparatus configured to take a moving image, such as a video camera. However, because the imaging apparatus configured to take a moving image has no focal plane shutter, it is almost impossible to solve the problem through the control of the shutter opening and closing timing. For the imaging apparatus, such as a video camera, it is necessary to read out signal charges in synchronization with an external synchronizing signal. The imaging apparatus therefore has a problem that it is difficult to control both the timing to read out signal charges and the light emission timing of the flash in a well-balanced manner.

Thus, it is desirable to provide a technique of preventing an inconvenience that the luminance of an image varies noticeably between the upper side and the lower side of the screen in an imaging apparatus performing line exposure.

According to an embodiment of the present invention, there is provided an imaging apparatus including: an imaging device in which photoelectric conversion elements accumulating signal charges obtained by photoelectric conversion are arrayed in a row direction and a column direction and an imaging device control portion that supplies, in synchronization with a synchronizing signal inputted therein, the imaging device with a read command signal to make the accumulated signal charges be outputted. The imaging apparatus also includes an operation input portion that accepts an input of a flash light emission command to make a flash to emit light. The imaging apparatus is configured in such a manner that a predetermined interval as long as or longer than a 2-frame period is set as an output interval of the read command signal that specifies reading of the accumulated signal charges. Further, the imaging apparatus is configured in such a manner that output timing of a flash control signal is set so that a period since a start till an end of light emission of the flash is included within a period since completion of reading of the signal charges by a first read command signal till an input of a following second read command signal. Moreover, the imaging apparatus is configured in such a manner that the read command signal is supplied to the imaging device in synchronization with a synchronizing signal inputted therein at the set predetermined interval. Furthermore, the imaging apparatus is configured in such a manner that the flash control signal is supplied to the flash according to timing at which an input of the flash light emission command to make the flash emit light is accepted and the set output timing of the flash control signal.

When configured in this manner, in the imaging apparatus performing line exposure, it becomes possible to make the flash emit light within a period since the completion of the reading of signal charges by a first read command signal until an input of a following second read command signal.

Further, because the interval at which the read control signal is supplied to the imaging device control portion is a predetermined interval as long as or longer than a 2-frame period, the signal charges are accumulated over a 2-frame period or longer.

According to the embodiment of the present invention, because the light emission timing of the flash and the accumulation period of the signal charges are adjusted, the light emission of the flash does not fall on the read period of the signal charges. It thus becomes possible to eliminate an inconvenience that the luminance of an image varies noticeably between the upper end and the lower end of the screen.

DESCRIPTION OF THE PREFERRED EMBODIMENTS

Hereinafter, embodiments of the present invention will be described with reference to FIG. 1 through FIG. 7. Description will be given in the following order.

1. Embodiment (example where accumulation operation is performed constantly)
2. Modification (accumulation operation is performed only when flash light emission is specified)

Embodiment

Example of the Configuration of System

Figure 1:
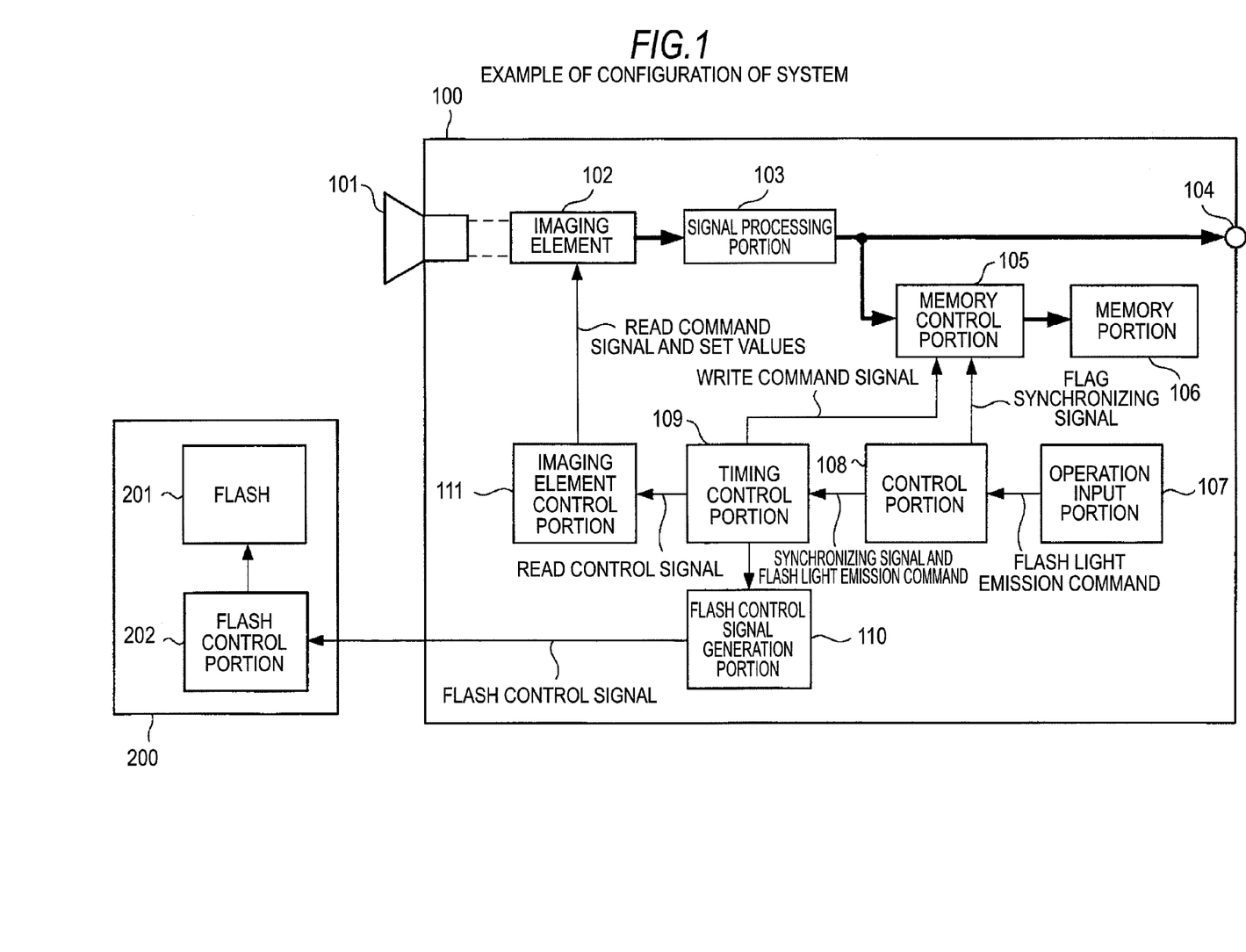
FIG. 1 is a block diagram showing an example of the internal configuration of a system according to an embodiment of the present invention.

FIG. 1 is a block diagram showing an example of the internal configuration of a system according to an embodiment of the present invention. The system shown in FIG. 1 is applied to an inspection device that conducts, for example, an examination of the fundus and includes an imaging apparatus 100 that takes a moving image and a flash generation device 200.

The flash generation device 200 has a flash 201 as a light emission portion and a flash control portion 202 that controls the flash 201 to emit light by applying a trigger voltage to an external trigger electrode (not shown) of the flash 201. The timing at which the flash control portion 202 applies a trigger voltage to the external trigger electrode of the flash 201 is controlled according to a flash control signal supplied from the imaging apparatus 100. It takes a predetermined time since the flash control signal is supplied from the imaging apparatus 100 until the flash 201 actually emits light and this time is referred to as the flash light emission required time in the following description.

The imaging apparatus 100 includes a lens 101 that captures subject light into the device, an imaging device 102, a signal processing portion 103, a video signal output portion 104, a memory control portion 105, and a memory portion 106. Further, the imaging apparatus 100 includes an operation input portion 107, a control portion 108, a timing control portion 109, a flash control signal generation portion 110, and an imaging device control portion 111.

Figure 2:
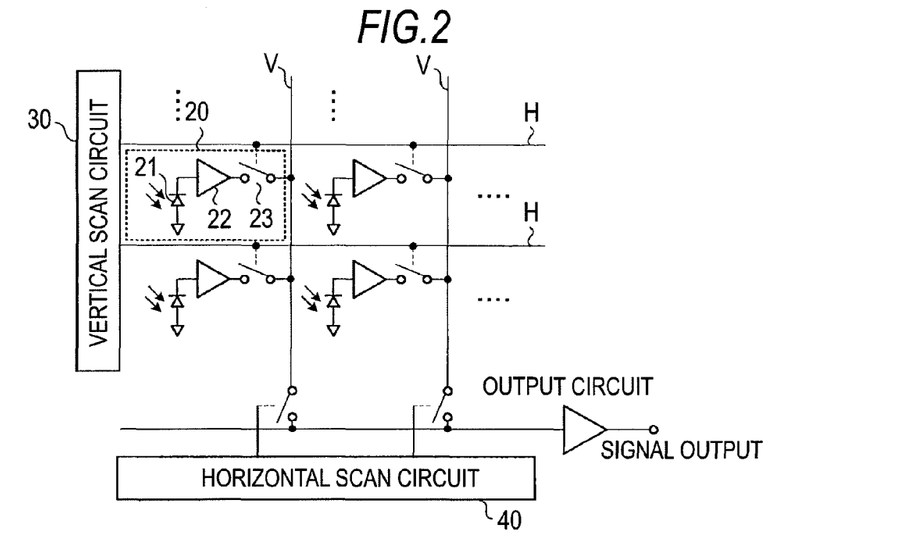
FIG. 2 is a block diagram showing an example of the internal configuration of an imaging apparatus according to an embodiment of the present invention.

The imaging device 102 is formed, for example, of a CMOS device and an example of the internal configuration is shown in FIG. 2. The imaging device 102 shown in FIG. 2 includes a plurality of pixels 20 arrayed in a row direction and in a column direction, a vertical scan circuit 30, and a horizontal scan circuit 40. The respective pixels 20 are connected to a plurality of row selection lines H and a plurality of column signal lines V and each pixel 20 has a photoelectric conversion element 21, an amplifier 22, and a switch 23.

The photoelectric conversion element 21 is formed of a photodiode or the like and it accumulates signal charges obtained by photoelectrically converting subject light coming incident thereon via the lens 101 (see FIG. 1). The amplifier 22 is formed of an amplifying element or an amplifying circuit and it amplifies and outputs the signal charges accumulated in the photoelectric conversion element 21. The switch 23 is formed of a transistor or the like and it opens and closes the switch according to scans by the vertical scan circuit 30 and the horizontal scan circuit 40.

The vertical scan circuit 30 selects a row selection line H among a plurality of the line selection lines H that is connected to a pixel 20 from which signal charges are to be read out according a read command signal supplied from the imaging device control portion 111 (see FIG. 1). The horizontal scan circuit 40 selects a column signal line V connected to the pixel 20 from which signal charges are to be readout in a state where the row selection line His selected by the vertical scan circuit 30 according to the read command signal supplied from the imaging device control portion 111. In the pixel 20 whose position is defined by specifying the row and the column, the switch 23 is closed, which allows signal charges amplified by the amplifier 22 to be outputted to the column signal line V. The signal charges sent to the column signal line V are outputted to the signal processing portion 103 (see FIG. 1) in the following stage.

Figure 3:
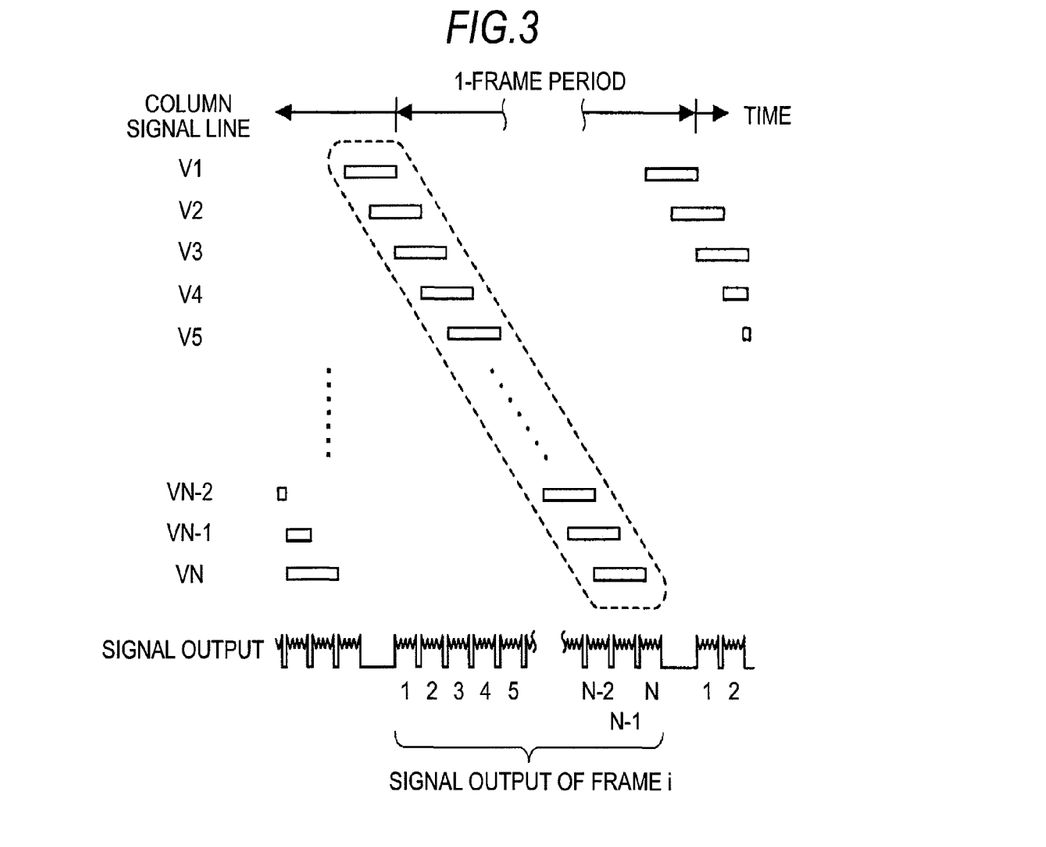
FIG. 3 is a view used to describe an example of shifts of a signal charges accumulation period among respective column signal lines V according to an embodiment of the present invention.

Each pixel 20 starts to accumulate photoelectrically converted signal charges again at the time point when it has outputted the signal charges. Accordingly, an accumulation period of signal charges shifts in the time direction among a plurality of the column signal lines V. FIG. 3 shows an example of shifts of the signal charges accumulation period among the respective column signal lines V.

The ordinate of FIG. 3 is used for the position of the column signal line V to show that the column signal lines V1 through VN (where N is a natural number) are arrayed sequentially from top to bottom. The abscissa is used for the time and the bottom row of FIG. 3 shows the timing at which signal charges sent from the respective column signal lines V are outputted. As is shown in FIG. 3, in the imaging device 102 shown in FIG. 2, the signal charges accumulation period shifts later by a time required for the scan for the column signal lines V at latter positions. In other words, the frame accumulation period in a given frame i (i is a natural number) is a period made of a sum of shift amounts of the respective column signal lines Vas is enclosed by a broken line. In short, the imaging device 102 according to an embodiment of the present invention performs line exposure. Herein, a case where the imaging device 102 is formed of a CMOS device has been described. It should be appreciated, however, that an embodiment of the present invention is also applicable to a case where the imaging device 102 is formed of an imaging tube or the like as long as it performs line exposure.

Referring to FIG. 1 again, descriptions of the respective portions forming the imaging apparatus 100 will be continued. The signal processing portion 103 applies signal processing, such as AGC (Automatic Gain Control) processing and gamma correction, to the signal charges outputted from the imaging device 102 and generates a video signal by adding a synchronizing signal to the signal charges. The signal processing portion 103 supplies the video signal thus generated to the video signal output portion 104 and to the memory control portion 105.

In synchronization with a synchronizing signal supplied from the control portion 108, which will be described below, the memory control portion 105 controls the memory portion 106 formed of an HDD (Hard Disk Drive) or the like to store a video signal. The video signal outputted from the signal processing portion 103 is provided with a flag indicating whether the video signal is to be stored in the memory portion 106 as a still image. The value of the flag is changed according to the control by the control portion 108. Upon input of a command to set the flag to 1 from the control portion 108, the memory control portion 105 changes the value of the flag to 1 and stores the video signal in the memory portion 106 as a still image. The value of the flag is changed to 1 for video signals accumulated in the imaging device 102 during the light emission period of the flash 201. Hence, images stored in the memory portion 106 as still images are images made up of video signals accumulated in the imaging device 102 during the light emission period of the flash 201.

The operation input portion 107 includes a switch that turns ON or OFF the setting of the flash in the flash generation device 200, a flash button (not shown) that specifies the light emission timing of the flash, and so forth. In a case where the user depresses the flash button, the operation input portion 107 generates a flash light emission command signal and supplies this signal to the control portion 108. The flash light emission command signal is also supplied to the timing control portion 109 via the control portion 108.

The control portion 108 is formed of an MPU (Micro Processing Unit) or the like and controls the respective portions forming the imaging apparatus 100. To be more concrete, it supplies a synchronizing signal to the timing control portion 109 and to the memory control portion 105. The control portion 108 also sets the output timing of a flash control signal to the flash generation device 200 and sets an output interval of a read command signal from the imaging device control portion 111 to the imaging device 102, that is, the accumulation period of the signal charges. The control portion 108 further issues a flag value change command to the memory control portion 105. The control on the output timing of a flash control signal and the accumulation period setting processing by the control portion 108 will be described more in detail below.

The timing control portion 109 generates a write command signal to the memory control portion 105 for the memory portion 106 in synchronization with a synchronizing signal supplied from the control portion 108 and supplies this signal to the memory control portion 105. The timing control portion 109 generates a read control signal to specify generation of a read command signal in the imaging device control portion 111 according to the flash light emission command signal supplied from the control portion 108 and the accumulation period set by the control portion 108. The timing control portion 109 supplies the read control signal thus generated to the imaging device control portion 111 in synchronization with the synchronizing signal supplied from the control portion 108. The timing control portion 109 further generates a signal that specifies generation of a flash control signal according to the flash light emission command signal supplied from the control portion 108 and the output timing of the flash control signal set by the control portion 108. The timing control portion 109 then supplies the signal thus generated to the flash control signal generation portion 110.

The flash control signal generation portion 110 generates a flash control signal at the timing at which the signal generation command is inputted therein from the timing control portion 109 and supplies this signal to the flash control portion 202 in the flash generation device 200. The imaging device control portion 111 generates the read command signal at the timing at which the read control signal is supplied from the timing control portion 109 and supplies this signal to the imaging device 102 together with the various set values stored in an unillustrated register.

Figure 4:
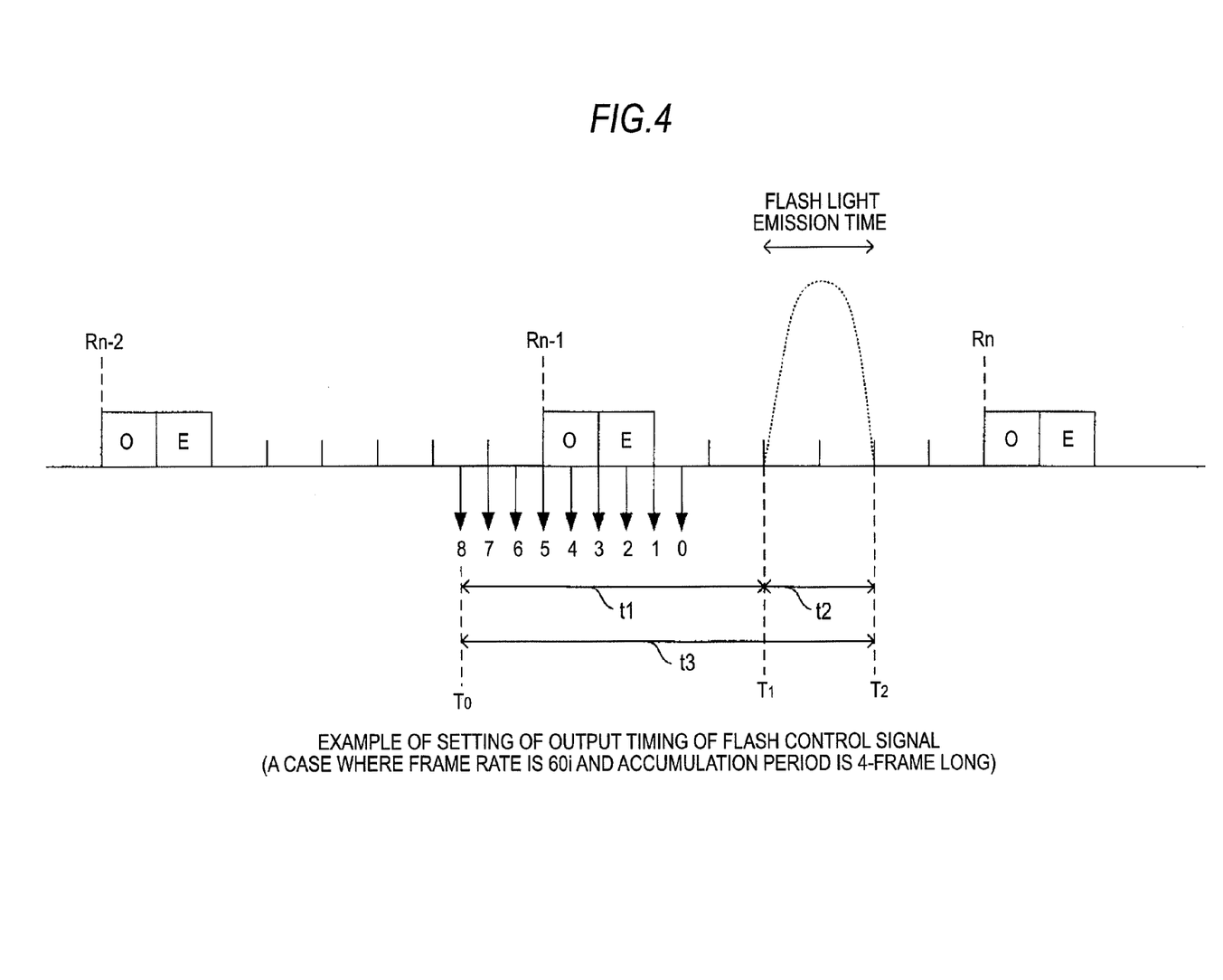
FIG. 4 is a view used to describe an example of output timing of a flash control signal in a control portion and the setting of an accumulation period of signal charges in a case where the frame rate is 60i according to an embodiment of the present invention.

Examples of setting of the output timing of the flash control signal and the accumulation period of the signal charges by the control portion 108 will now be described with reference to FIG. 4. FIG. 4 shows an example of the correspondence between the light emission timing of the flash and the accumulation period of the signal charges and the abscissa is used for the time. In the drawing, $R_{n-2}$, $R_{n-1}$, and $R_n$ denote the timings at which the read command signal is supplied to the imaging device 102 from the imaging device control portion 111, and the signal charges accumulated in the imaging device 102 are read out by the read command signal. Hereinafter, $R_{n-2}$, $R_{n-1}$, and $R_n$ are also referred to as the read timing.

The example shown in FIG. 4 will be described on the assumption that the frame rate is set to 60i (interlace). Accordingly, it shows that an odd-numbered field denoted as "E" is read out following an even-numbered field denoted as "O". Because the imaging device 102 starts to accumulate the following signal charges simultaneously with the output of the signal charges, the signal charges are accumulated in the imaging devices 102, for example, during a period since the signal charges are read out at the read timing $R_{n-1}$ until the following read timing $R_n$ comes.

According to the embodiment of the present invention, the accumulation period of the signal charges in the imaging device 102 is set to an m-frame period as long as or longer than 2-frame period. The accumulation period is set to be longer than a period since the start till the end of light emission by the flash 201 of the flash generation device 200 (see FIG. 1). Accordingly, the accumulation period may be set to other periods, such as a 3-frame period and a 4-frame period.

In the example shown in FIG. 4, the period since the flash 201 starts light emission at a time $T_1$ till it ends light emission at a time $T_2$ is substantially a 2-frame period. According to the embodiment of the present invention, the signal charges accumulation period in the imaging device 102 is set to a 4-frame period. By making the settings in this manner, light emission by the flash 201 hardly falls on the timing at which the signal charges are read out from the imaging device 102.

The output timing of the flash control signal is set to the timing so that the light emission of the flash 201 does not fall on the read period of the signal charges from the imaging device 102. In the example shown in FIG. 4, in order to avoid light emission of the flash from falling on the read period of the signal charges, it seems sufficient to set the output timing of the flash control signal to or after a time point "1" at which reading of the signal charges of a 1-frame period is completed, for example, at a time point "0". Actually, when the flash light emission required time $t_1$ is substantially 0, by outputting the flash control signal at the time point "0", it becomes possible to take a long period as a period over which light emission by the flash 201 is allowed.

However, as has been described, in the system according to the embodiment of the present invention, it takes a time indicated as $t_1$ since the flash control signal is outputted until the flash 201 actually emits light (assume that the required time $t_1$ until light emission is predetermined by the specifications or the like). Accordingly, when the flash control signal is outputted at the time point "0", the flash 201 emits light at the time point about $R_n$ when the flash light emission required time $t_1$ has elapsed since the time point "0". In short, the light emission by the flash 201 falls on the read period of the signal charges.

Such being the case, it is necessary to set the flash control signal output timing $T_0$ to a position for the position of the flash light emission start time point $T_1$ and the position of the flash light emission end time point $T_2$ to satisfy the following conditions:

$R_{n-1} < T_1 < R_n$ $R_{n-1} < T_2 < R_n$.

Initially, the position of the flash light emission end point $T_2$ is temporarily set to a predetermined point earlier than the read out command signal output timing $R_n$ following the output timing $R_{n-1}$ of a given read command signal. Because the light emission time $t_2$ since the flash 201 emits light until the light emission ends is known, the point found by subtracting the light emission time $t_2$ from the flash light emission end time point $T_2$ is the flash light emission start time point $T_1$. Accordingly, the output timing $T_0$ of the flash control signal is set to a point before the time point found by subtracting the flashlight emission required time $t_1$ from the flash light emission start time point $T_1$.

Also, it is necessary to set the flash light emission start time point $T_1$ later than the point at which the reading of the signal charges at the read timing $R_{n-1}$ is completed. Accordingly, the position of the output timing $T_0$ is set to a point later than the time point found by subtracting the flash light emission required time $t_1$ from the flash light emission start time point $T_1$. By setting the output timing $T_0$ of the flash control signal to the predetermined point within the range satisfying the conditions specified above, it becomes possible to set the timing at which the flash 201 actually emits light not to fall on the read timing of the signal charges according to the flash control signal. In short, the flash 201 never fails to emit light during the accumulation period of the signal charges.

In the example shown in FIG. 4, the interval of supply timings indicated by arrows is, for example, 8 msec, and the timing eight supply timings earlier than the point "0" at which the reading of the signal charges of a 1-frame period is completed is set as the output timing $T_0$ of the flash control signal within the range satisfying the conditions specified above.

The generation timing of the flash control signal in the flash control signal generation portion 110 is determined by the output timing $T_0$ set in the control portion 108 and the timing at which the user depresses the flash button. In a case where the flush button is depressed, the flash light emission command signal is generated in the operation input portion 107, and the flash light emission command signal is supplied to the flash control signal generation portion 110 by way of the control portion 108 and the timing control portion 109. In other words, the flash control signal generation portion 110 determines the output timing of the flash control signal by actually generating the flash control signal on the basis of the set values in the control portion 108 and the timing at which the flash light emission command signal is inputted.

For example, in a case where the flash light emission command signal is supplied at timing earlier than the time point of the output timing $T_0$ of FIG. 4, it is possible to output the flash control signal to the flash control portion 202 (see FIG. 1) of the flash generation device 200 at the time point of the output timing $T_0$. However, in a case where the flash light emission command signal is inputted quite immediately before the output timing $T_0$, there may be a case where the flash control signal is neither generated nor outputted by the timing of the output timing $T_0$. In such a case, the flash control signal generation portion 110 waits until the following output timing $T_{01}$ (not shown) comes, and outputs the flash control signal when the output timing $T_{01}$ has come. In the example shown in FIG. 4, the following output timing $T_{01}$ is a time point eight signal supply timings earlier than the point at which the reading of the signal charges of a 1-frame period is completed by the reading at $R_n$.

In other words, upon input of the flash light emission command signal, the flash control signal generation portion 110 determines whether generation and output of the flash control signal are allowed at the output timing $T_0$ that will come next in time. Upon judging that the generation and the output are allowed, the flash control signal generation portion 110 generates and outputs the flash control signal. Otherwise, the flash control signal generation portion 110 waits for the next timing and generates and outputs the flash control signal when the next timing comes.

Figure 5:
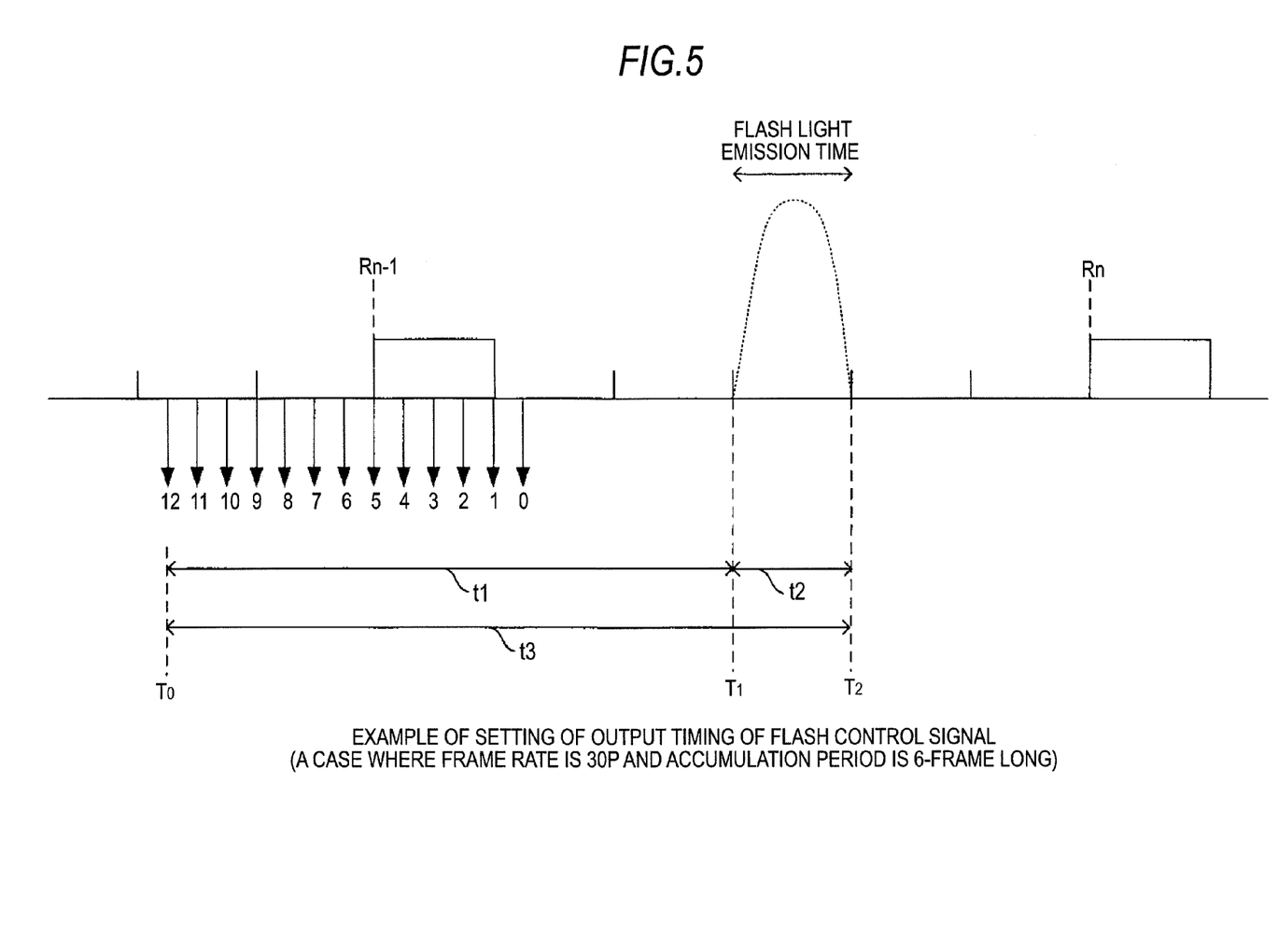
FIG. 5 is a view used to describe an example of output timing of a flash control signal in the control portion and the setting of an accumulation period of signal charges in a case where the frame rate is 30P according to an embodiment of the present invention.

The description was given to the example where the frame rate is 60i (interlace) and the signal charges are read out over a 1-frame period with reference to FIG. 4. It should be appreciated, however, that the present invention is not limited to this example. For example, as is shown in FIG. 5, the present invention is applicable to a case where the frame rate is 30P (progressive) or a case where the signal charges are read out over a time as short as about a ½ frame period. In the example shown in FIG. 5, the accumulation period of the signal charges is a period of six frames. Also, in reference to supply timings of the synchronizing signal, the output timing $T_0$ of the flash control signal is a time point 12 supply timings earlier than the point at which the reading of the signal charges of a 1-frame period is completed by the reading at $R_{n-1}$.

Description of Operation

Figure 6:
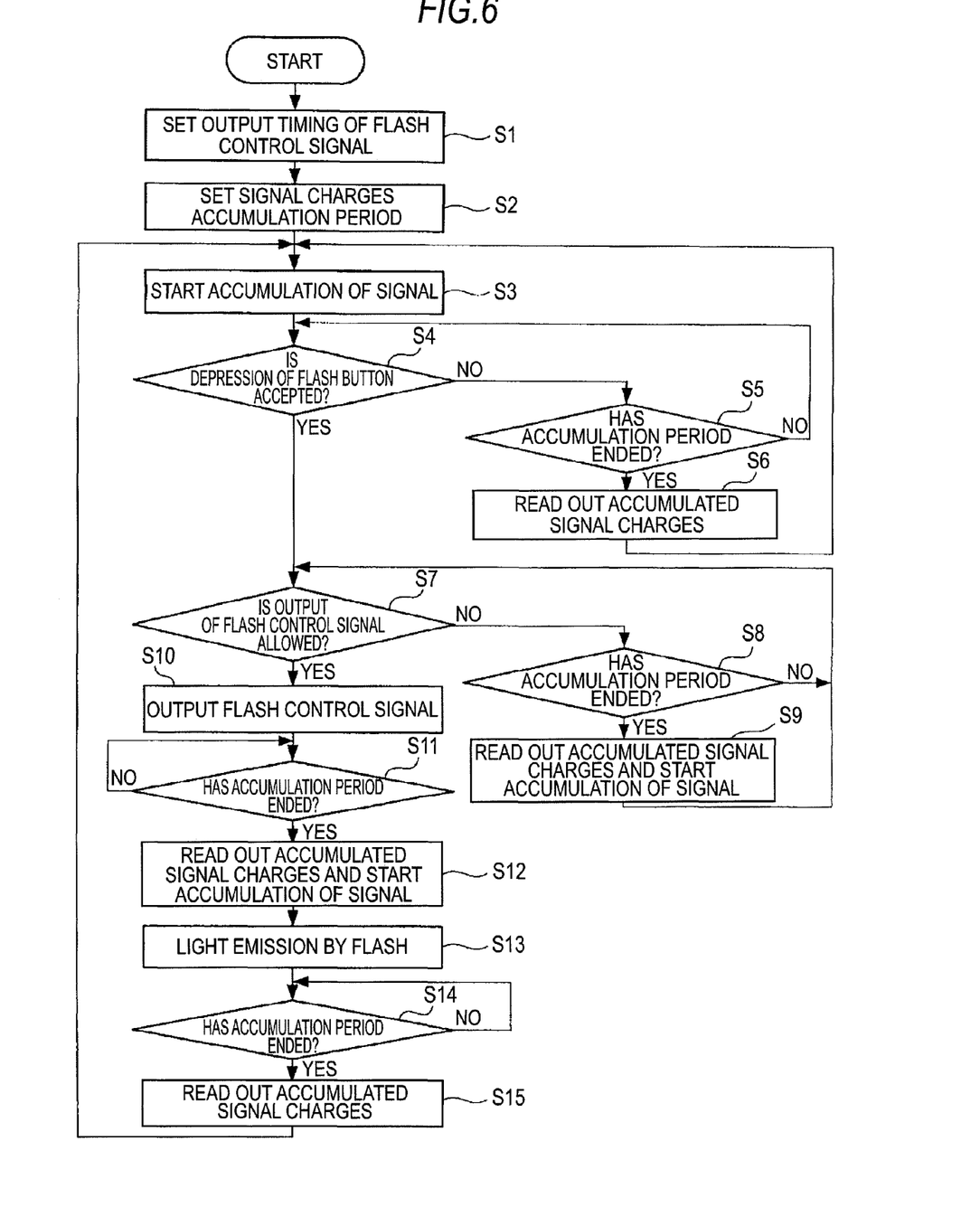
FIG. 6 is a flowchart showing an example of light emission timing control of the flash and signal charges accumulation period adjustment processing according to an embodiment of the present invention.

An example of operations of the imaging apparatus 100 will now be described with reference to the flowchart of FIG. 6. FIG. 6 is a flowchart showing an example of the light emission timing control of the flash and the signal charges accumulation period adjustment processing according to the embodiment of the invention. Referring to FIG. 6, the signal charges accumulation period is set in the control portion 108 first (Step S1). Subsequently, the output timing of the flash control signal is set also in the control portion 108 (Step S2). Accordingly, the accumulation of the signal charges in the imaging device 102 is started according to the accumulation period set in Step S1 (Step S3).

Subsequently, whether the flash button is depressed is determined by the flash control signal generation portion 110 (Step S4). In other words, whether the flash light emission command signal is inputted from the timing control portion 109 (see FIG. 1) is determined. In a case where the flash light emission command signal is not inputted, whether the set accumulation period has ended is determined (Step S5). In a case where the accumulation period has not ended, the determination in Step S4 is made repetitively. In a case where the set accumulation period has ended, in other words, in a case where the read command signal is supplied to the imaging device 102 from the imaging device control portion 111, the signal charges accumulated in the imaging device 102 are read out (Step S6). The flow then returns to Step S3 to accumulate the signal charges. In other words, the processing to accumulate the signal charges in the imaging device 102 over the accumulation period set in Step S1 and to read out the signal charges when the accumulation period ends is performed continuously until the user depresses the flash button. As has been described, the accumulation and the reading of the signal charges are performed in synchronization with the synchronizing signal supplied from the control portion 108.

In a case where it is determined in Step S4 that the flash button is depressed, whether the output of the flash control signal by the flash control signal generation portion 110 is allowed is determined (Step S7). In a case where the output of the flash control signal is not allowed, whether the accumulation period of the signal charges accumulated in the imaging device 102 has ended is determined (Step S8). In a case where the accumulation period has not ended, the determination in Step S7 is made repetitively. In a case where the accumulation period has ended, not only the accumulated signal charges are read out, but also the accumulation of new signal charges is started (Step S9), and the determination in Step S7 is made again. In other words, the accumulation and the reading of the signal charges according to the supply timing of the synchronizing signal are performed until the next timing at which the output of the flash control signal is allowed.

In a case where it is determined in Step S7 that the output of the flash control signal is allowed, the flash control signal is generated in the flash control signal generation portion 110 and the flash control signal thus generated is outputted to the flash generation device 200 (see FIG. 1) (Step S10).

Subsequently, whether the accumulation period of the signal charges accumulated in the imaging device 102 has ended is determined (Step S11). In a case where the accumulation period has not ended, the determination in Step S11 is made repetitively. In a case where the accumulation period has ended, not only the accumulated signal charges are read out, but also the accumulation of new signal charges is started (Step S12).

The flash 201 then emits light at the timing at which the flash light emission required time $t_1$ has elapsed since the supply of the flash control signal to the flash generation device 200 (Step S13). After the light emission, whether the accumulation period of the signal charges accumulated in the imaging device 102 has ended is determined (Step S14). In a case where the accumulation period has not ended, the determination in Step S14 is made repetitively. In a case where the accumulation period has ended, not only the accumulated signal charges are read out, but also the flow returns to Step S3 to start the accumulation of new signal charges.

In addition, according to the embodiment of the present invention described above, because the accumulation period of the signal charges is set to an m-frame period, which is a period longer than the light emission time $t_2$ of the flash 201, the light emission of the flash 201 hardly falls on the read period of the signal charges.

Also, according to the embodiment of the present invention described above, by controlling the output timing of the flash control signal that specifies light emission of the flash 201, the signal charges will not be read out from the imaging device 102 since the start till the end of the light emission by the flash 201.

Also, according to the embodiment of the present invention, by performing the flag value change processing by the control portion 108, a still image made up of only a video signal accumulated in the imaging device 102 during the light emission period of the flash 201 is not stored in the memory portion 106. It thus becomes possible to eliminate an inconvenience that the luminance of an image varies between the top and the bottom of the screen.

Also, according to the embodiment of the present invention described above, the accumulation and the reading of the signal charges are performed in synchronization with an external synchronizing signal while the light emission timing of the flash 201 is controlled. It thus becomes possible to control the light emission timing of the flash 201 to be the most suitable timing even in an imaging apparatus for which it is necessary to perform the imaging in synchronization with an external synchronizing signal.

Modification

Figure 7:
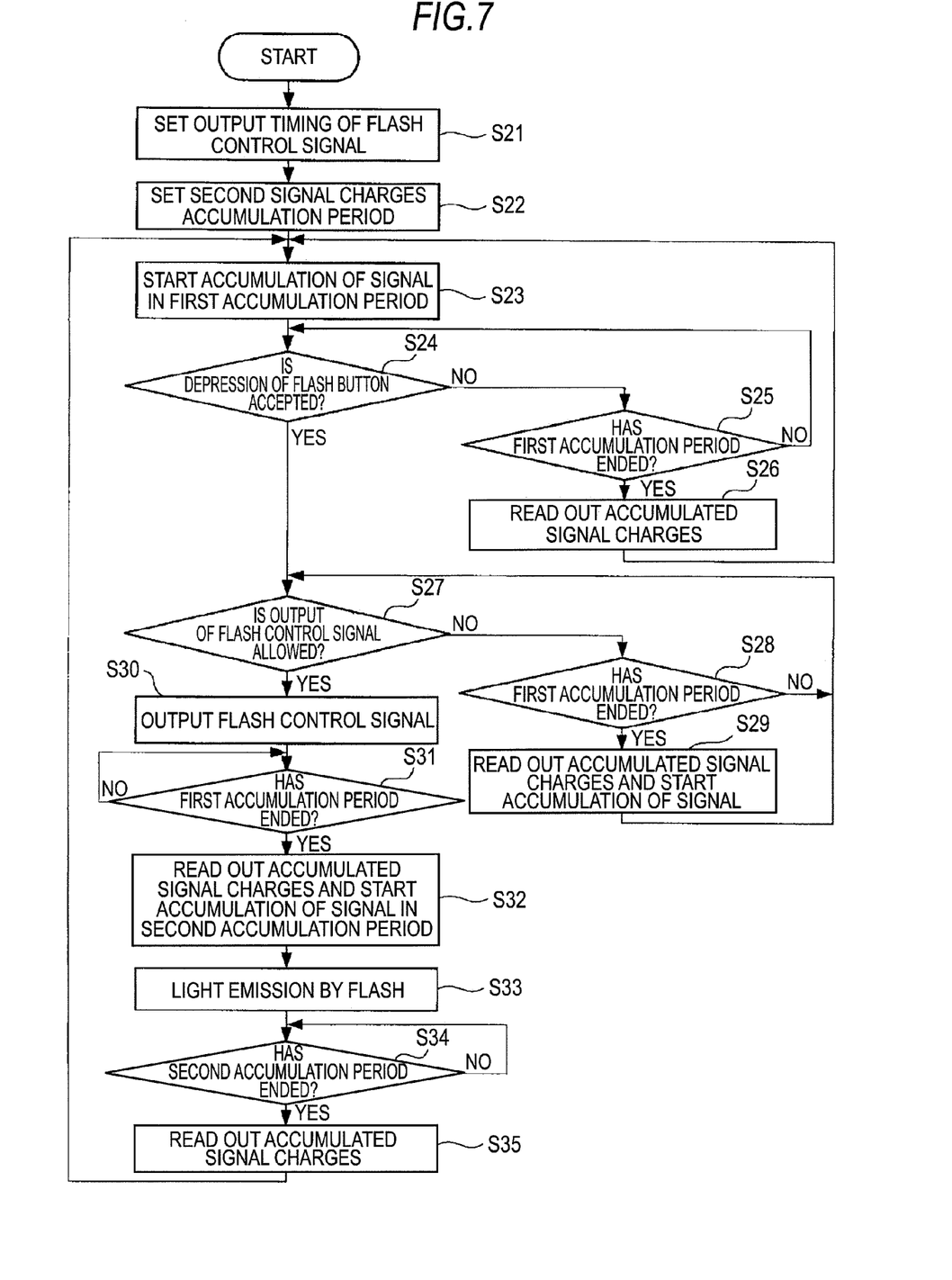
FIG. 7 is a flowchart showing an example of light emission timing control of the flash and signal charges accumulation period adjustment processing according to another embodiment of the present invention.

An example where an accumulation operation of the signal charges is performed constantly has been described above by way of the embodiment of the present invention. However, it may be configured in such a manner that the accumulation operation is performed only at the timing of the flash light emission. An example of the processing in this case will now be described with reference to FIG. 7. FIG. 7 is a flowchart showing an example of the light emission timing control of the flash and the signal charges accumulation period adjustment processing according to a modification of the present invention. Referring to FIG. 7, a second accumulation period different from the normal signal charges accumulation period is set in the control portion 108 first (Step S21). The second accumulation period corresponds to the m-frame period as long as or longer than a 2-frame period described above.

In this modification, the accumulation period of the signal charges is set longer only at the light emission timing of the flash 201 and in the other segments, the accumulation and the reading of the signal charges are performed per frame as in normal operations. In the following description, the normal accumulation period of signal charges is referred to as the first accumulation period.

Subsequently, the output timing of the flash control signal is set also in the control portion 108 (Step S22). Accordingly, the accumulation of the signal charges in the imaging device 102 is started according to the accumulation period set in Step S21 (Step S23). As has been described, the accumulation and the reading of the signal charges are performed in synchronization with a synchronizing signal supplied from the control portion 108.

Subsequently, whether the flash button is depressed is determined in the flash control signal generation portion 110 (Step S24). In other words, whether the flashlight emission command signal is inputted from the timing control portion 109 (see FIG. 1) is determined. In a case where the flash light emission command signal is not inputted, whether the first accumulation period has ended is determined (Step S25). In a case where the first accumulation period has not ended, the determination in Step S24 is made repetitively. In a case where the accumulation period has ended, that is, in a case where the read command signal is supplied to the imaging device 102 from the imaging device control portion 111, the signal charges accumulated in the imaging device 102 are read out (Step S26). The flow then returns to Step S23 to accumulate the signal charges. In other words, the processing to accumulate the signal charges in the imaging device 102 during the first accumulation period as in normal operations and to read out the signal charges when the accumulation period ends is continuously performed until the user depresses the flash button.

In a case where it is determined in Step S24 that the flash button is depressed, whether the output of the flash control signal by the flash control signal generation portion 110 is allowed is determined (Step S27). In a case where the output of the flash control signal is not allowed, whether the accumulation period (first accumulation period) of the signal charges accumulated in the imaging device 102 has ended is determined (Step S28). In a case where the accumulation period has not ended, the determination in Step S27 is made repetitively. In a case where the accumulation period has ended, not only the accumulated signal charges are read out, but also the accumulation of new signal charges is started (Step S29), and the determination in Step S27 is made again. In other words, the accumulation and the reading of the signal charges are performed according to the supply timing of the synchronizing signal until the next timing at which the output of the flash control signal is allowed.

In a case where it is determined in Step S27 that the output of the flash control signal is allowed, the flash control signal is generated in the flash control signal generation portion 110 and the flash control signal thus generated is outputted to the flash generation device 200 (see FIG. 1) (Step S30).

Subsequently, whether the first accumulation period of the signal charges accumulated in the imaging device 102 has ended is determined (Step S31). In a case where the first accumulation period has not ended, the determination in Step S31 is made repetitively. In a case where the accumulation period has ended, not only the accumulated signal charges are read out, but also the accumulation of new signal charges is started in the second accumulation period (Step S32).

The flash 201 then emits light at the timing at which the flash light emission required time $t_1$ has elapsed since the supply of the flash control signal to the flash generation device 200 (Step S33). After the light emission, whether the second accumulation period of the signal charges accumulated in the imaging device 102 has ended is determined (Step S34). In a case where the second accumulation period has not ended, the determination in Step S34 is made repetitively. In a case where the accumulation period has ended, not only the accumulated signal charges are read out, but also the flow returns to Step S33 to start the accumulation of new signal charges.

According to the modification whose processing is shown in FIG. 7, the accumulation operation of m frames is not performed in segments other than the light emission timing of the flash 201 and the accumulation and the reading of the signal charges are performed in a normal cycle. Accordingly, in the segments other than the light emission timing of the flash 201, continuous moving images are taken and stored in the memory portion 106.

The sequential processing according to the embodiment of the present invention described above can be performed by hardware. However, the processing can be performed by software as well. In a case where the sequential processing is performed by software, a program making up the software is run on a computer incorporating special hardware or the program is installed in a general personal computer to run the program thereon.

Herein, the steps describing the program making up the software include the processing performed in time series in order of description. It should be appreciated, however, that the processing is not necessarily performed in time series and the processing may be performed in parallel or separately.

The present application contains subject matter related to that disclosed in Japanese Priority Patent Application JP 2008-264332 filed in the Japan Patent Office on Oct. 10, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an imaging device in which photoelectric conversion elements accumulating signal charges obtained by photoelectrically converting subject light are arrayed in a row direction and a column direction;
an imaging device control portion that supplies, in synchronization with a synchronizing signal inputted therein, the imaging device with a read command signal to make the accumulated signal charges be outputted;
an operation input portion that accepts an input of a flash light emission command to make a flash to emit light;
a control portion that sets a predetermined interval as long as or longer than a 2-frame period as an output interval of the read command signal in the imaging device control portion and sets output timing of a flash control signal to make the flash to emit light so that a period since a start till an end of light emission of the flash is included within a period since completion of reading of the signal charges by a first read command signal till an input of a following second read command signal; and
a timing control portion that supplies the flash control signal to the flash and supplies a read control signal to make the read command signal be outputted to the imaging device control portion at the predetermined interval set by the control portion according to an input of the flash light emission command from the operation input portion and the output timing set in the control portion,
wherein the accumulation and reading of the signal charges according to the supply timing of the synchronizing signal are performed until a next timing at which the output of the flash control signal is allowed.

2. The imaging apparatus according to claim 1,
wherein the predetermined interval as the output interval of the read command signal is set to a time longer than a time since light emission of the flash is started until the light emission ends.

3. The imaging apparatus according to claim 2,
wherein the output timing of the flash control signal by the control portion is set according to a required time since the flash control signal to make the flash to emit light is outputted until the flash actually emits light, a light emission period of the flash, and the output interval of the read command signal.

4. The imaging apparatus according to claim 3,
wherein the read control signal at the predetermined interval as long as or longer than a 2-frame period by the timing control portion is supplied only when the flash light emission command is inputted into the operation input portion.

5. The imaging apparatus according to claim 3 further comprising:
a signal processing portion that converts the signal charges outputted from the imaging device to a video signal; and
a memory control portion that stores the video signal generated in the signal processing portion into a memory portion under control,
wherein the control portion turns ON a flag indicating that the flash has emitted light in the video signal generated according to the signal charges accumulated during the light emission of the flash, and
the memory control portion accumulates the video signal in which the flag is turned ON into the memory portion as a still image under control.

6. An imaging method comprising the steps of:
accumulating signal charges obtained by photoelectrically converting subject light by respective photoelectric conversion elements arrayed in a row direction and a column direction;
setting a predetermined interval as long as or longer than a 2-frame period as an output interval of a read command signal that specifies reading of the accumulated signal charges, and setting output timing of a flash control signal to make a flash to emit light so that a period since a start till an end of light emission of the flash is included within a period since completion of reading of the signal charges by a first read command signal until an input of a following second read command signal;

supplying the read command signal to an imaging device at the set predetermined interval in synchronization with an inputted synchronizing signal;

accepting an input of a flash light emission command to make the flash to emit light; and supplying the flash control signal to the flash according to the inputted flash light emission command and the output timing of the set flash control signal, wherein the accumulation and reading of the signal charges according to the supply timing of the synchronizing signal are performed until a next timing at which the output of the flash control signal is allowed.

* * * * *